(12) United States Patent
Lenell et al.

(10) Patent No.: US 6,449,271 B1
(45) Date of Patent: Sep. 10, 2002

(54) SYSTEM FOR AND METHOD OF, PROVIDING A HEADER AND A TRAILER IN DATA PACKETS

(75) Inventors: John K. Lenell, Huntington Beach; David L. Fisher, Laguna Niguel; Andrew J. Castellano, Laguna Beach, all of CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 09/523,415

(22) Filed: Mar. 10, 2000

Related U.S. Application Data

(63) Continuation of application No. 08/970,643, filed on Nov. 14, 1997, now Pat. No. 6,088,354.

(51) Int. Cl.[7] .................................................. H04J 3/24
(52) U.S. Cl. ...................................... 370/383; 370/389
(58) Field of Search ................................. 370/434, 445, 370/383, 389, 399, 400, 395, 394, 393, 392, 351, 352, 503, 504, 514, 518, 520, 523, 524, 447, 443, 457, 461, 441, 535, 537; 709/221

(56) References Cited

U.S. PATENT DOCUMENTS

| | | | |
|---|---|---|---|
| 4,525,837 A | 7/1985 | Tan et al. ..................... | 370/85 |
| 4,566,097 A | 1/1986 | Bederman ..................... | 370/89 |
| 4,885,743 A | 12/1989 | Helbers et al. ............ | 370/85.2 |
| 5,265,094 A | 11/1993 | Schmickler et al. ....... | 370/85.3 |
| 5,301,303 A | * 4/1994 | Abraham et al. ........... | 370/434 |
| 5,305,321 A | 4/1994 | Crayford .................... | 370/94.1 |
| 5,526,353 A | 6/1996 | Henley et al. ............. | 370/60.1 |
| 5,530,842 A | * 6/1996 | Abraham et al. ........... | 370/434 |

\* cited by examiner

Primary Examiner—Dang Ton
(74) Attorney, Agent, or Firm—McAndrews, Held & Mallory, Ltd.

(57) ABSTRACT

A header substituted for preamble nibbles by an individual one of the originating devices in a plurality, and an individual one of the ports in such originating device, indicates such originating device and such port. Such port in such originating device sends such modified packet to others of the originating devices and to an observing station. The header format is such that the last nibble in the header and the remaining preamble portion will not be confused with any two (2) nibbles in the header. A particular one of the originating devices indicated in the data converts the header back to the preamble format and transmits the converted packet to a receiving station. The observing station records the individual originating device, and the individual port in such device, indicated in the header. Each packet includes at its end a trailer formed from a plurality of nibbles and indicating whether or not a collision has occurred between such packet and a packet from another one of the originating devices.

7 Claims, 14 Drawing Sheets

FIG.1
PRIOR ART
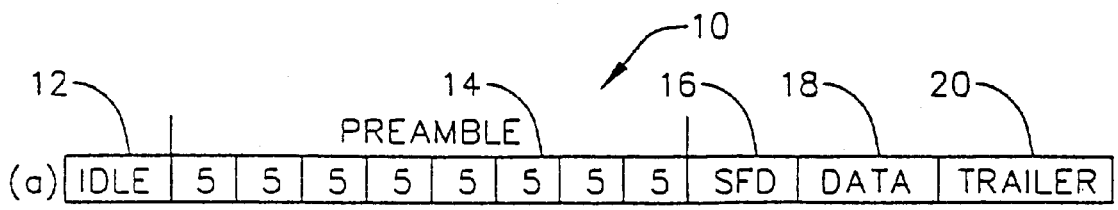
FIG.2
PRIOR ART
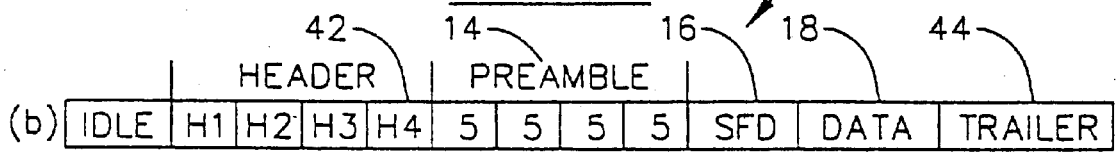
FIG.3
| HEADER NIBBLE | XD3 | XD2 | XD1 | XD0 |
|---|---|---|---|---|
| H1 | PGI3 | PGI2 | PGI1 | PGI0 |
| H2 | '0' | '0' | '0' | '0' |
| H3 | '0' | '0' | PGI5 | PGI4 |
| H4 | PID3 | PID2 | PID1 | PID0 |

| TRAILER NIBBLE | XD3 | XD2 | XD1 | XD0 | XDV | XERR |
|---|---|---|---|---|---|---|
| T1 | '0' | '0' | '0' | '0' | '0' | '0' |
| T2 | IPG5 | IPG4 | IPG3 | IPG2 | '0' | '0' |
| T3 | IPT1 | IPG0 | EV1 | EV0 | '0' | '0' |
| T4 | CS3 | CS2 | CS1 | CS0 | '0' | '0' |

| EV[1:0] | DESCRIPTION |
|---|---|
| 00 | NORMAL PACKET |
| 01 | RUNT FRAME |
| 10 | SECURITY VIOLATION |
| 11 | LONG FRAGMENT |

| TRAILER NIBBLE | XD | XDV | XERR |
|---|---|---|---|
| T1 | '0' | '0' | '0' |
| T2 | '0' | '0' | '1' |
| T3 | '0' | '0' | '1' |
| T4 | '0' | '0' | '1' |

DATA FORWARDING

SFD DETECT STATE MACHINE

DATA PROCESSING STATE MACHINE

FIG.19

TABLE 5. SIGNAL DEFINITIONS

| SIGNAL | DEFINITION |
|---|---|
| RXDV | RECEIVE DATA VALID INDICATION FROM RECEIVING PORTS |
| RXDATA | RECEIVE DATA FROM RECEIVING PORTS(INCLUDES PREAMBLE AND SFD) |
| TXDATA | TRANSMIT DATA TO PORTS FROM THE FIFO |
| HDR1-4 | 4-BIT HEADER VALUE AS SHOWN IN TABLE 1 |
| TRLR1-4 | 4-BIT TRAILER VALUE AS SHOWN IN TABLE 3 AND 4 |
| COUNTEN | COUNT ENABLE FOR COLLISION RESOLUTION TIMER |
| COUNT_DN | TIMER COMPLETE INDICATION FROM COLLISION RESOLUTION TIMER |
| GOTSFD | INDICATION OF VALID SFD DETECTED ON THE XDATA BUS |
| FIFOLOAD-ENABLE | DATA INPUT ENABLE FOR FIFO AFTER DETECTING SFD |
| UCT | UNCONDITIONAL TRANSFER. STATE TRANSITION OCCURS ON THE NEXT CLOCK AND IS NOT DEPENDENT UPON ANY INPUT STIMULUS. |

10

SYSTEM FOR AND METHOD OF, PROVIDING A HEADER AND A TRAILER IN DATA PACKETS

This application is a continuation of U.S. application Ser. No. 08/970,643, filed Nov. 14, 1997, now U.S. Pat. No. 6,088,354.

This invention relates to a system for, and method of, providing a header for indicating to an observing station an individual one of a plurality of originating devices, and an individual one of the ports in such originating device, providing packets of data. The invention also relates to a system for, and a method of, providing a trailer for indicating whether a collision has occurred between the transmission of packets from such individual one of the ports in such individual one of the originating devices and packets from another one of the originating devices.

BACKGROUND OF THE INVENTION

Systems are provided for transmitting data in packets. Each packet may have at least a particular length (e.g. at least 512 nibbles) where each nibble consists of a plurality (e.g. four (4)) binary bits. Each packet may include a preamble, a start-of-frame delimiter and data. The preamble in each packet is provided to synchronize the subsequent nibbles in the packet with clock signals. The preamble may consist of a plurality of nibbles each having the same particular format. The start-of-frame delimiter includes a plurality of nibbles indicating that data follows such delimiter. In addition to providing information, the data may include an identification of the source of the packet and the recipient of the packet.

It is sometimes desired to make a record of the individual one of the originating devices, and the individual one of the ports in such originating device, providing the packets. Two (2) different approaches have been provided in the prior art to record such information. One approach has been to provide additional signal lines to record the individual one of the originating devices, and the individual one of the ports in such originating device, providing the packets. The use of such additional signal lines is not satisfactory because it unduly complicates the construction of the system. A second approach has been to provide a trailer at the end of the packet to indicate the individual one of the originating devices and the individual one of the ports in such originating device. This is not desirable because it shortens the space between successive packets.

Sometimes two (2) originating devices transmit packets at the same time. This causes a collision to occur between the two (2) packets. Any other originating device simultaneously receiving the two (2) packets will become confused and accordingly generate wrong information. It is desirable to record the occurrence of such a collision. It is also desirable to record other information upon the occurrence of a collision. This would include the spacing between successive packets and indications of a normal packet or variations from a normal packet. No one until now has used the same lines normally used for passing the packet in order to record the occurrence of collisions, the spacing between packets and indications for each packet that the packet is normal or varies in specified ways from a normal packet.

BRIEF DESCRIPTION OF THE INVENTION

This invention provides a system for, and method of, providing and recording the different information specified *above. For example, the system and method of this invention provide such information in a relatively straightforward manner without complicating the construction of the system. The system and method of this invention illustratively provide for a recording of the individual one of the originating devices in a plurality, and the individual one of the ports in such originating device, providing packets of information. The system and method of this invention also provide for the determination of collisions between packets simultaneously transmitted from two (2) of the originating devices in the plurality and for the indication of the occurrence of such collisions.

In one embodiment of the invention, each packet normally consists of a preamble, a start-of-frame delimiter and data. The preamble has nibbles each having a particular format. A header substituted for preamble nibbles by an individual one of the originating devices in a plurality, and an individual one of the ports in such originating device, indicates such device and such port in such originating device. Such port in such originating device sends such modified packet to others of the originating devices and to an observing station.

The header format is such that the last nibble in the header and the remaining preamble portion will not be confused with any two (2) nibbles in the header. A particular one of the originating devices indicated in the data converts the header back to the preamble format and transmits the converted packet to a receiving station. The observing station records the originating device, and the port in such device, indicated in the header.

Each packet includes at its end a trailer formed from a plurality of nibbles and indicating whether or not a collision has occurred between such packet and a packet from another one of the originating devices. The trailer in each packet may also indicate additional information—e.g. whether the packet (a) is a normal packet, (b) is a runt packet, (c) is from an unacceptable source and (d) the delay between each packet end and the next packet start. The information in the trailer for each packet passes to the observing station.

BRIEF DESCRIPTION OF THE DRAWINGS

FIG. 1 is a diagram showing the different portions of an information packet normally transmitted in the prior art;

FIG. 2 is a diagram showing the different portions of an information packet modified in accordance with the concepts of this invention, such different portions including a header for indicating an individual one of a plurality of originating devices, and an individual one of the ports in such originating device, sending such packet;

FIG. 3 is a table showing how the header indicates the individual one of the plurality of originating devices and the individual one of the ports in such originating device;

FIG. 19 is a table specifying the definitions of various terms used in the previous figures.

DETAILED DESCRIPTION OF THE INVENTION

Figures 4, 5, 6:
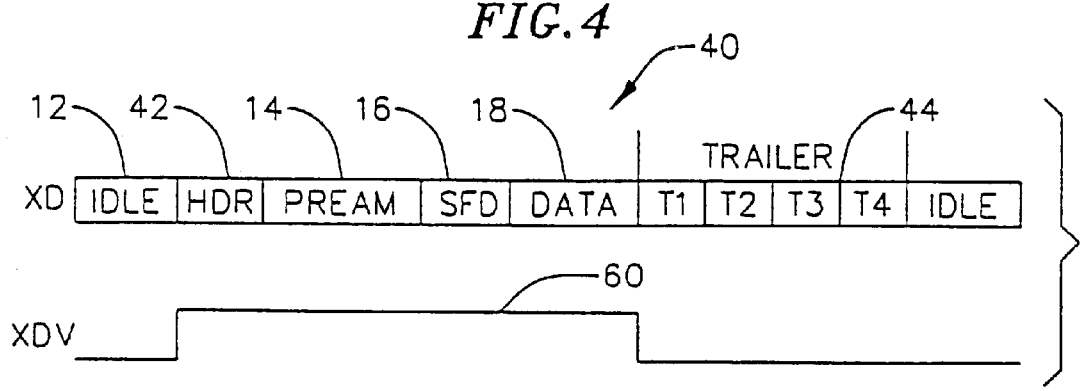
FIG. 4 is a diagram, similar to that shown in FIGS. 1 and 2, of the different portions of a packet and includes a header and also includes a trailer at the end of the packet for indicating the occurrence of a collision resulting from a simultaneous transmission of packets from two (2) of the originating devices in the plurality and also includes a waveform showing the transmission of the signals in the packet when no collision occurs.
FIG. 5 is a table similar to that shown in FIG. 3 and shows how the trailer in the packet indicates a lack of a collision between packets and also indicates other specific data.
FIG. 6 is a table showing how different data other than the occurrence or lack of occurrence of a collision are indicated in the table shown in FIG. 5.

FIG. 1 is a schematic view of an information packet, generally indicated at 10, normally provided in the prior art. The packet is formed from a plurality of nibbles each formed from a plurality of binary bits. For example, each nibble may be illustratively formed from four (4) binary bits which may be provided in a parallel relationship. The packet 10 may be provided with an idle portion 12, a preamble 14, a start-of-frame delimiter 16, data 18 and a trailer 20.

The preamble 14 is provided at the beginning of the packet 10 to synchronize the presentation of the successive nibbles in the packet with a clock signal. Each nibble 14 in the preamble may have the same format as the other nibbles in the preamble. For example, each nibble in the preamble may indicate an analog value of "5" in hexadecimal coded form.

The start-of-frame delimiter 16 indicates the beginning of the data portion 18 of the packet 10. It is provided in a particular pattern. It is followed by the data portion 18 of the packet 10. The data portion 18 provides the information in the packet. It may also indicate the source from which the packet 10 is provided. It may additionally indicate the station which is to receive the packet.

Figure 10:
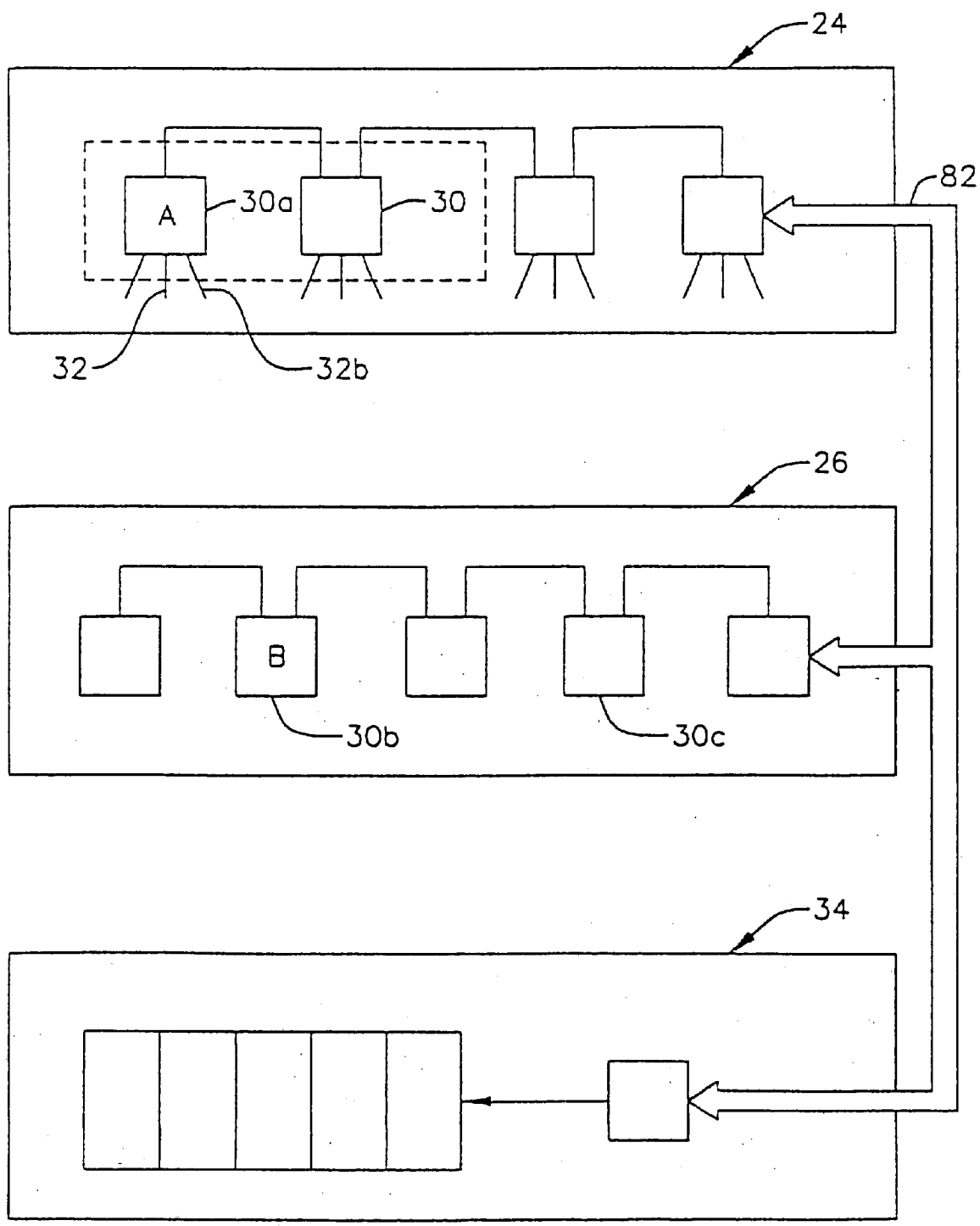
FIG. 10 is a schematic circuit diagram showing in block form a plurality of originating devices on a pair of printed circuit boards for receiving and transmitting packets of information and further showing an observing station on another printed circuit board for recording the information in the headers of packets transmitted by an individual one of the originating devices and by an individual one of the ports in such originating device.

In one embodiment of the invention, a plurality of integrated circuit boards generally indicated at 24 and 26 in FIG. 10 may be provided. Although only two (2) boards 24 and 26 are shown in FIG. 10, it will be appreciated that a considerably greater number of boards than two (2) may be provided.

Each of the boards such as the boards 24 and 26. may have a substantially identical construction. Each of the boards 24 and 26 may include a plurality of integrated circuit chips 30. Each of the chips 30 may have a substantially identical construction. For example, each of the chips 30 may constitute a 5205 chip developed by, and fabricated for, applicant's assignee of record in this application. Each of the chips 30 may be considered to constitute an originating device. The cumulative number of originating devices 30 on the boards 24 and 26 may be considered to constitute a plurality. Each of the originating devices 30 has a plurality of ports 32. The packets 10 pass into an individual one of the originating devices 30 through an individual one of the plurality of ports 32 in such individual one of the originating devices. As previously described, the packets 10 include the trailer 20 in one form of the prior art shown in FIG. 1. The trailer 20 indicates an individual one 30a of the originating devices 30 and the individual one (e.g. 32b) of the ports 32 for passing the packets from such originating device. The packets 10 pass to an observing station 34 which records the individual one 30a of the originating devices 30, and the individual one (e.g. 32b) of the ports 32 in the originating device 30a, through which the packets pass. As will be appreciated, it would be better not to provide the trailer 20 at the end of the packets 10 to record the originating device 30a and the port 32b because this constitutes an inefficient use of the space between successive packets.

FIG. 2 shows packets generally indicated at 40. The packets 40 have been modified by applicants from the packets 10 of the prior art to obtain the advantages of this invention. As will be seen, the packets 40 are substantially identical to the packets 10 except that they substitute a header 42 for a portion of the preamble 14. Furthermore, a trailer 44 is included at the end of the packets 40 but the trailer 44 provides completely different functions than the trailer 20 in the packets 10 and provides these different functions on a more efficient basis than in the prior art. This will be described in detail subsequently.

The header 42 may be formed from four (4) nibbles respectively designated as H1, H2, H3 and H4. They constitute substitutions for the first four (4) nibbles in the preamble 14 in the packets 10. The nibbles H1, H2, H3 and H4 are not used to provide a synchronization with the clock signals. They are used to indicate the originating device 30a, and the port 32b in the originating device 30a, through which the packets 40 pass.

FIG. 3 is a table indicating the format of the header 42 formed by the nibbles H1, H2, H3 and H4. As will be seen, each of the nibbles H1, H2, H3 and H4 may illustratively be formed from four (4) binary bits. It will be appreciated that a different number of bits than four (4) may be used to define each nibble without departing from the scope of the invention. Six (6) of the binary bits in the table are respectively designated as "PG15", "PG14", "PG13", "PG12", "PG11" and "PG10". These indicate an individual one of sixty-four (64) different originating devices 30. Four (4) of the binary bits in the table are respectively designated as "PID3", "PID2", "PID" and "PID0". These indicate an individual one of sixteen (16) possible different ports in the individual one of the originating devices represented by the designations "PG15"–"PG10".

It is desirable that the four (4) binary bits in the nibble H4 and in the first nibble in the remaining portion of the preamble 14 have a pattern different from the binary bits in any two (2) successive nibbles in the start-of-frame delimiter 16. This prevents any confusion from arising between the header and the preamble in the packet 40 on the one hand and the start-of-frame delimiter in such packet on the other hand when the information in the packet 40 is processed. It is also desirable that the last nibble in the header and the remaining preamble portion will not be confused with any two (2) nibbles in the header.

As indicated previously, the packets 40 pass from the originating device 30a to all of the other originating devices 30 in the plurality. The packets 40 may pass through an originating device 30b in accordance with the instructions from the external source (not shown). However, before the packets 40 pass through the originating device 30b, the header 42 represented by the nibbles H1, H2, H3 and H4 is converted in the originating device 30b to the particular pattern in the preamble 14.

The packets 40 also pass to the printed circuit board 34. The printed circuit board 34 may be considered to provide an observing station. It includes an integrated circuit chip designated as the 5205 by applicants' assignee of record in this application and developed by, and fabricated for, such assignee. The observing station 34 processes the information in the header 42 and, from such processing, determines the identity of the originating device 30a, and the individual one of the ports 32b in such originating device, through which the packets 40 pass. The observing station 34 then records, in a memory 52 indicated as "statistics" in FIG. 17, the identity of the originating device 30a and the individual one of the ports 32b in such originating device. The observing station 34 also detects and records whether any informalities (e.g., the delimiter) are missing from the packet.

Figure 20:
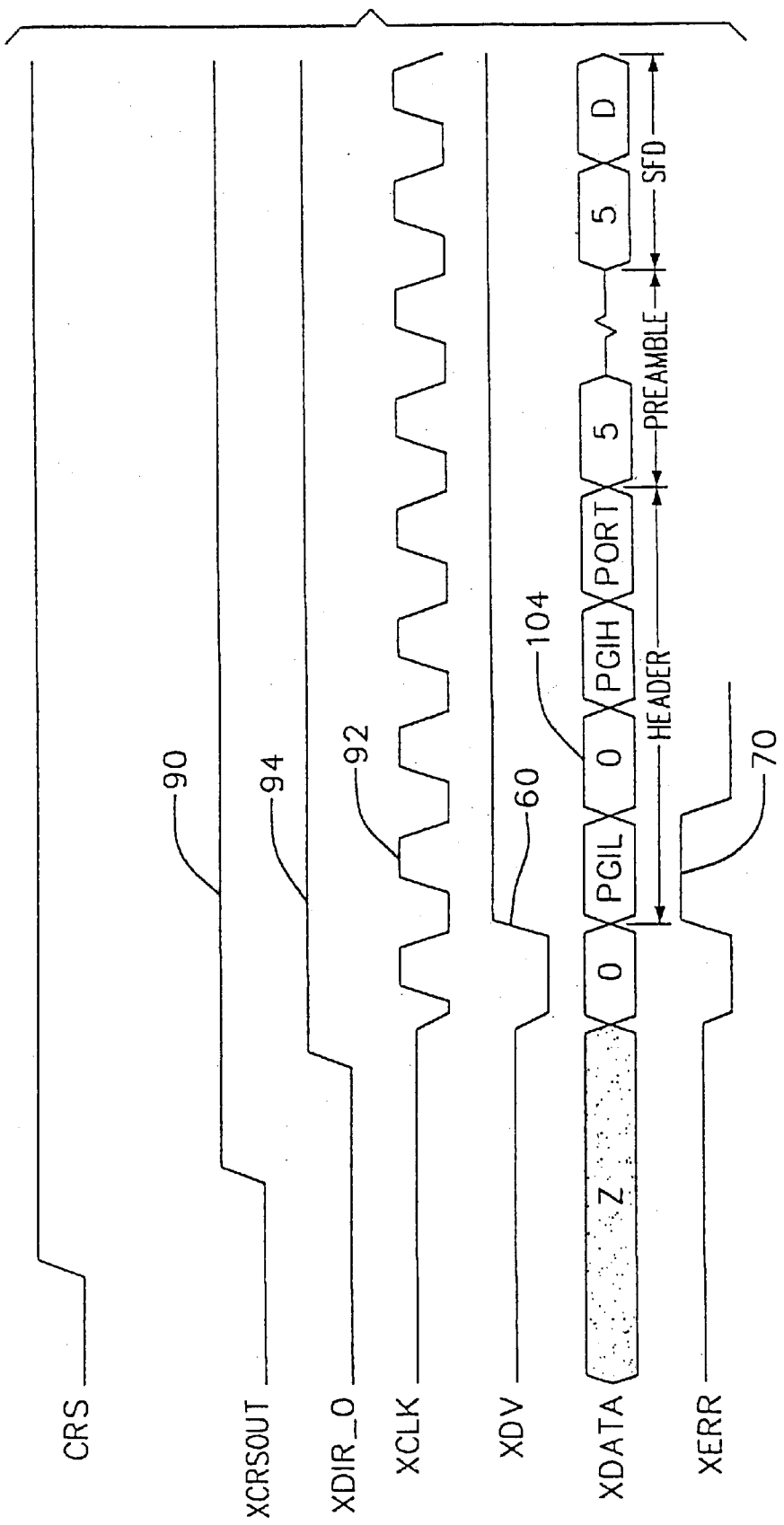
FIG. 20 shows voltage wave forms at strategic terminals in circuitry included in some of the previous Figures.

The trailer 44 in the packets 40 provides a different function than the trailer 20 in the packets 10. As shown in FIGS. 4 and 20, an expansion data valid (XDV) signal 60 is produced at the beginning of the header 42 in the packets 40. The expansion data valid signal 60 then continues until the end of the data 18. When there is no collision as a result of a simultaneous transmission of packets from the originating device 30a and another one of the originating devices 30, the XDV signal is negated during the production of the trailer 18 represented by the nibbles T1, T2, T3 and T4. The failure to produce a collision can be seen from FIG. 4 in the line designated as "XDV" since no signal is produced during the nibbles T1, T2, T3 and T4.

FIG. 5 provides a table showing the signals which are produced during the nibbles T1, T2, T3 and T4 when there is no collision between a packet from the originating device 30a and a packet from another one of the originating devices 30. In this table, the successive designations "IPG5" to "IPG0" indicate the gap between successive pairs of the packets 40 from the originating device 30a.

In FIG. 5, four (4) nibbles "CS3–CS0" are provided. These nibbles provide a check sum to indicate whether the nibbles H1–H4 and the nibbles T2 and T3 constitute proper indications. These nibbles have proper indications when the values provided in these nibbles cumulatively have a particular value. This is well known in the prior art.

The designations "EV1" and "EV0" in the table shown in FIG. 6 are combined to provide several different indications which represent several different special situations. Illustrative examples of these special situations are shown in FIG. 6 and discussed below but other examples of these special situations may be provided without departing from the scope of the invention.

When the binary bits EV1 and EV0 in FIG. 6 are both zero (0), a normal packet such as indicated at 40 may illustratively be provided. When the binary bit EV1 is 0 and the binary bit EV0 is 1, a runt frame or packet may illustratively be indicated. A packet generally consists of at least 128 nibbles. When the number of nibbles in the packet 40 is less than 128, a runt frame or packet is indicated. A runt frame or packet is generally not processed. However, sometimes a runt frame or packet is sent to a separate receiver to control internal features in the receiver. The runt frame or packet then instructs that receiver how to handle certain calls to that receiver.

A binary value of 1 for EV1 and a binary value of 0 for EV0 in FIG. 6 may illustratively indicate to the observing EV0 at 34 that the packet being received at the observing station is from an unacceptable source. Binary values of 1 for each of EV1 and EV0 may illustratively indicate that the packet 40 is malformed. For example, the packet 40 may be missing the start-of-frame delimiter 16.

The table shown in FIG. 5 includes a column designated as "XERR". This column indicates whether there is a collision as a result of a simultaneous transmission of packets by the originating device 30a and by another of the originating devices 30. As will be seen, there is a "0" indication in the column XERR in FIG. 5 for each of the nibbles T1, T2, T3 and T4. This indicates that no collision has occurred.

Figures 7, 8:
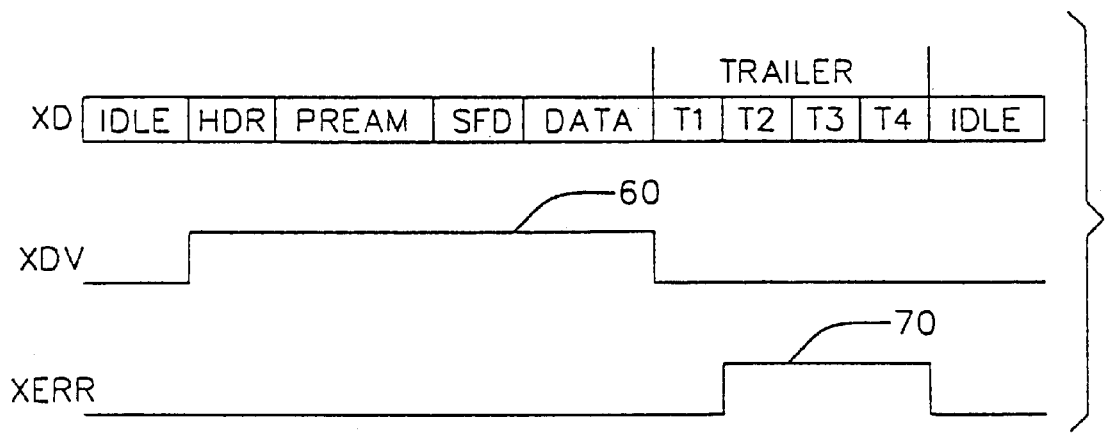
FIG. 7 is a diagram, similar to that shown in FIG. 4, of a packet with a header and a trailer and shows the signal waveform produced in the packet upon a lack of occurrence of a collision between this packet and another packet and additionally shows the signal waveform produced in the packet upon the occurrence of a collision.
FIG. 8 is a table showing the pattern of signals produced in the trailer in a packet when there is a collision between this packet and the simultaneous transmission of another packet.

FIG. 7 is similar to FIG. 4 except that it indicates a collision between the packet 40 from the originating device 30a and a packet from one of the other originating devices 30. This may be seen by the production of a collision signal 70, in the column designated as XERR in FIG. 7, during the production of the nibbles T2, T3 and T4. In the table shown in FIG. 8, the column designated as "XD" actually corresponds to the columns XD3, XD2, XD1 and XD0 in the table shown in FIG. 5.

When a collision occurs, all of the values in the columns XD3, XD2, XD1 and XD0 become zero since the transmission of packets becomes halted in midstream when a collision occurs. In this way, only a collision indication is provided in the nibbles T1, T2, T3 and T4 when a collision occurs. This is indicated by a binary "0" in the nibble T1 and by a binary "1" in each of the nibbles T2, T3 and T4. A binary "0" is provided in the nibble T1 in the XERR column to maintain compatibility with the first nibble for a normal trailer.

Figure 9:
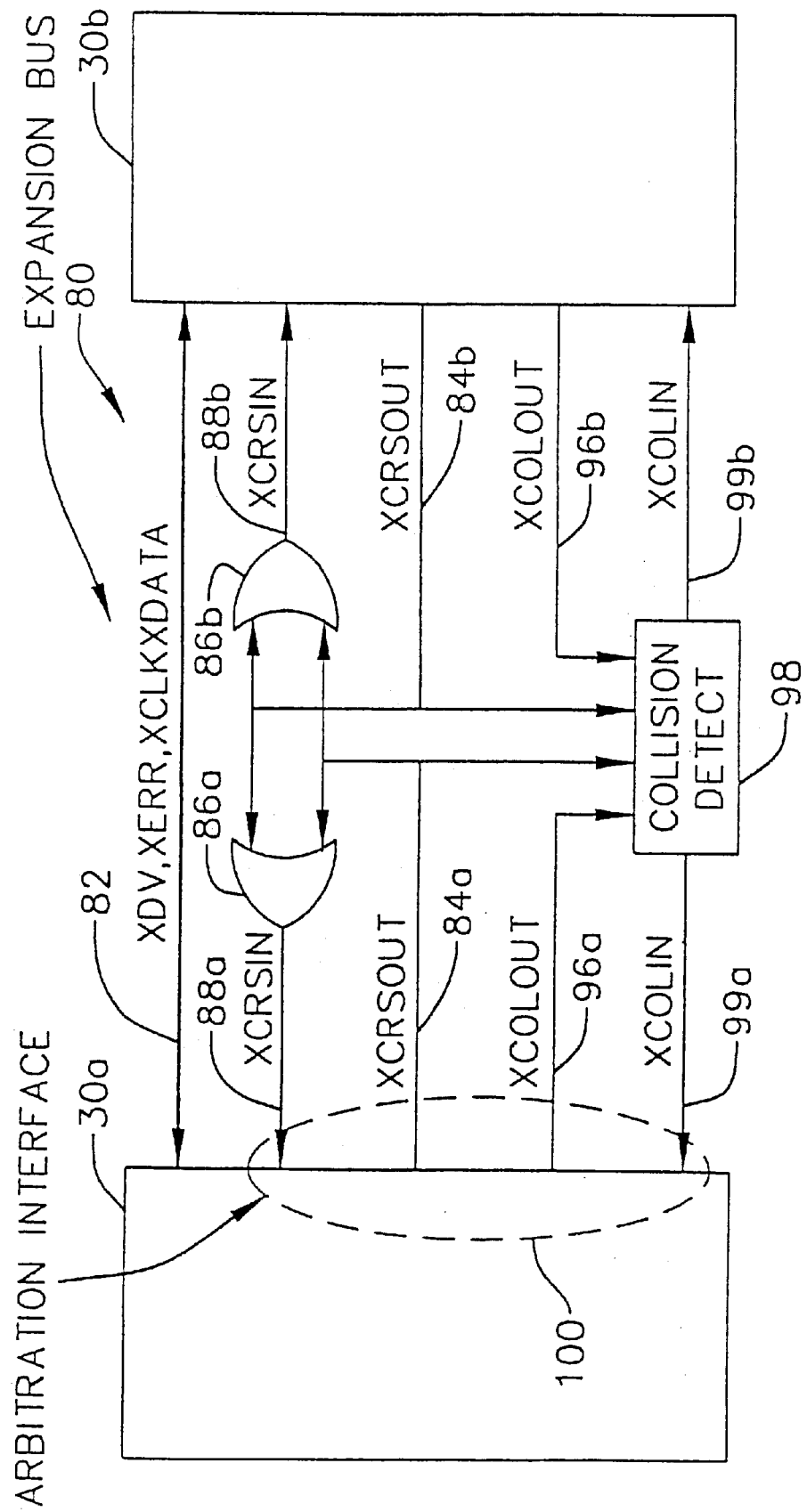
FIG. 9 is a block diagram of circuitry for detecting collisions between packets simultaneously transmitted by a pair of originating devices.

FIG. 9 is a circuit diagram schematically illustrated at 80 and showing a system for indicating how two (2) originating devices 30a and 30c operate to indicate a collision between packets simultaneously transmitted by such originating devices. The system 80 indicates an expansion bus 82 for passing the XDV and XERR signals (also shown in FIG. 8) and the XCLK and XDATA signals between the originating devices 30a and 30c. XCRSOUT signals respectively pass from the originating devices 30a and 30c through lines 84a and 84b to "or" networks 86a and 86b.

The XCRSOUT signals on the lines 84a and 84b indicate that an individual one of the originating devices 30a and 30c is about to transmit a packet. The XCRSOUT signal on one of the lines 84a and 84b indicates to the other originating devices 30 (including the originating device 30c) that one of the originating devices (e.g. 30a) is about to transmit a packet. The XCRSOUT signal from the originating device 30a passes through the "or" networks 86a and 86b and XCRSIN lines 88a and 88b to the originating devices 30a and 30c to indicate to such originating devices that the originating device 30a is about to send a packet.

The XCRSOUT signal is indicated at 90 in FIG. 20. The XCRSOUT signal 90 is generated by a clock on one of the printed circuit boards (e.g. the board 24 in FIG. 10). This clock is different from the clock (XCLK) on the expansion bus 82. The XCLK signal is indicated at 92 in FIG. 20. Because of this, the XCRSOUT signal can be generated before the generation of the XCLK signals 92. An XDIR_0 signal 94 is generated a particular period of time after the generation of the XCRSOUT signal 90. The difference in time between the initiation in the generation of the XCRSOUT signal 90 and the XDIR_0 signal 94 may be considered to constitute a Collision Resolution Time. This difference in time is indicated at 95 in FIG. 20. The Collision Resolution Time is provided to allow other originating devices than the originating device 30a time to indicate to the originating device 30a that at least one of such other originating devices will be transmitting a packet simultaneously with the transmission of a packet by the originating device 30a.

FIG. 9 also shows XCOLOUT signals respectively passing through lines 96a and 96b from the originating devices 30a and 30c to a collision detect stage 98. The XCOLOUT signals indicate a collision as a result of a simultaneous transmission of packets by two originating devices such as the originating devices 30a and 30c. XCOLIN signals respectively pass from the collision detect stage 98 through lines 99a and 99b to the originating devices 30a and 30c. The XCOLIN signals indicate to the originating devices 30a and 30c that a collision has occurred as a result of the simultaneous transmission of packets by such originating devices. As will be seen, the XCOLIN signals indicate to all of the originating devices 30 on the printed circuit boards 24 and 26 that a collision has occurred.

When the Collision Resolution Time 95 in FIG. 20 has expired without the occurrence of an XCOLIN signal, the originating device 30a starts to drive the expansion bus 82 in FIG. 9 in providing data for transmission to the other originating devices including the originating device 30c in FIGS. 9 and 10 as discussed above. This occurs when the XCLK line starts to provide clock signals as indicated at 92 in FIG. 20 and when the originating device 30a provides a data valid signal as indicated at 60 in FIGS. 4 and 20. The originating device then provides the header 42, the remainder of the preamble 14, the start-of-frame delimiter 16, the data 20 and the trailer 44 to the expansion bus 82. This is indicated at 104 in FIG. 20. If the XCOLIN signal is asserted by the collision detect stage 98 at any time prior to the expiration of the Collision Resolution Time (95 in FIG. 20), the expansion bus 82 remains undriven for the remainder of the packet from the originating device 30a.

It may sometimes happen that the XCOLIN signal is detected after the Collision Resolution Time has expired. When this occurs, the originating device 30a driving the expansion bus 82 generates a collision trailer as indicated at 70 in FIGS. 7 and 20 and discontinues any driving of the expansion bus 82. As will be seen at 70 in FIG. 20, the collision trailer 70 is generated as soon as a collision is detected as a result of a simultaneous transmission of packets by the originating device 30a and one of the other originating devices 30.

A broken oval is indicated at 100 in FIG. 9 for the originating device 30a. This broken oval encloses the line 88a (XCRSIN), the line 84a (XCRSOUT), the line 96a (XCOLOUT) and the line 99a (XCOLIN). This broken oval also encloses the portion of the originating device 30a receiving signals on the lines 88a, 84a, 96a and 99a. The portion of the system within the broken oval 100 is designated as "Arbitration Interface." It indicates the portion of the circuitry shown in FIG. 9 that arbitrates whether a collision has or has not occurred.

One key to the backplane arbitration system shown in FIG. 9 and described above is the Collision Resolution Time. The duration of this time is set to be greater than the time required for the collision detect block 98 to signal XCOLIN to the originating devices 30a and 30c in the worst case in the operation of the system. If the algorithm for providing a collision detect signal requires a time greater than the Collision Resolution Time, multiple ones of the originating devices 30 will be able to drive the expansion bus 82 simultaneously, thereby destroying the signal integrity of the bus.

In applicant's embodiment of the invention, the observing station 34 in FIG. 10 does not maintain a record of collisions because the trailer nibbles T1–T4 indicate that a collision has occurred. It will be appreciated, however, that it is within the scope of the invention for the observing station 34 to indicate the occurrence of a collision. At any rate, the trailer nibbles T1–T4 distinguish to the observing station 34 between a collision and a runt frame or packet. In this way, the observing station 30 records only a runt frame or packet and does not record a shortened packet resulting from a collision. Furthermore, the originating device 30a indicates a collision when the collision has occurred between a packet from the originating device 30a and one of the other originating devices 30 in the system.

Figure 11:
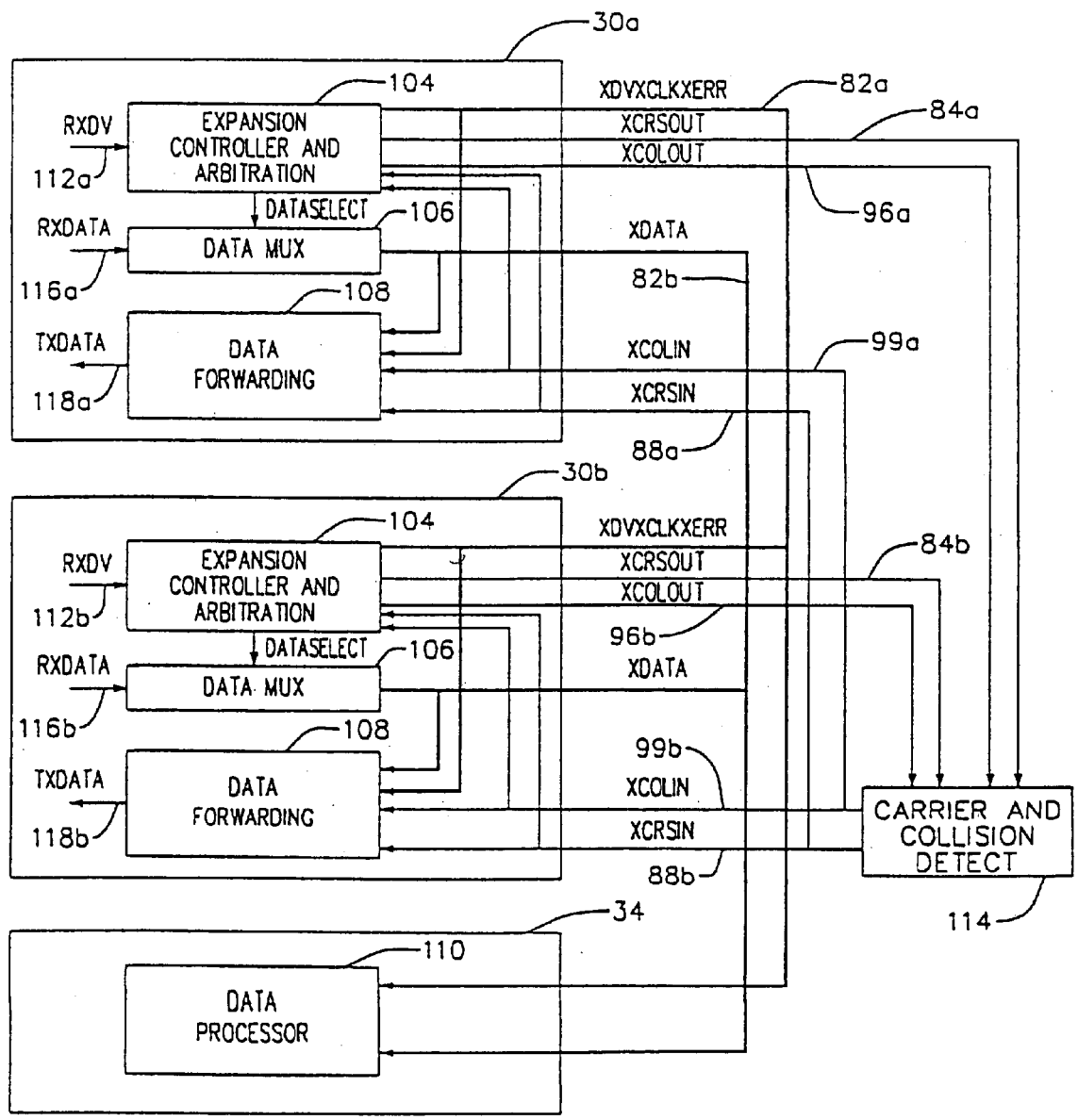
FIG. 11 is a circuit diagram showing in additional detail a pair of the originating devices shown in FIG. 10 and also showing in additional detail the circuit interrelationships between the originating devices and the observing station.

FIG. 11 is a schematic circuit diagram of an expansion bus system which includes the originating devices 30a and 30c and includes the observing station 34. The expansion bus 82 (also shown in FIGS. 9 and 10) is divided into two (2) segments, one indicated at 82a and the other indicated at 82b. The expansion bus 82a provides information relating to the data valid (xdv) signal 60 in FIGS. 4 and 20, the clock (XCLK) 92 in FIG. 20 and the collision (XERR) signal 70 in FIGS. 7 and 20. The expansion bus 82b provides the xdata signals indicated at 104 in FIG. 20. As will be seen, each of the expansion buses 82a and 82b interconnects the originating devices 30a and 30c and the observing station 34. This interrelationship is known in the prior art and is not affected in any way by the system or method of this invention. This is one of the advantages of the system of this invention.

Each of the originating devices 30a and 30c in FIG. 11 includes an expansion controller and arbitration stage 104, a data multiplexer (MUX) 106 and a data forwarding stage 108. The expansion controller and arbitration stage 104 provides much of the functions shown in FIG. 9 and described above in connection with FIG. 9. The data multiplexer 106 provides for a controlled passage of the header nibbles (H1–H4) and the trailer nibbles (T1–T4). The data forwarding stage 108 provides for a controlled transfer of the nibbles representing the data in each packet. The stages 104, 106 and 108 are shown in detail in subsequent Figures and additional discussion relating to these stages will be provided subsequently in connection with these Figures.

The observing station 34 includes a data processor 110 for providing a controlled passage of the nibbles H1–H4 representing the header and the nibbles T1–T4 representing the trailer. The data processor 110 is shown in additional detail in FIGS. 17 and 18. Additional discussion relating to the data processor 110 will be provided in connection with these Figures.

The expansion controller and arbitration stages 104 in the originating devices 30a and 30c receive a data valid signal on lines 112a and 112b. This data valid signal is indicated at 60 in FIGS. 4, 7 and 20. The stages 104 in the originating devices 30a and 30c respectively provide the XCRSOUT signals (also shown in FIG. 9) on the lines 84a and 84b to the carrier and collision detect stage 114 and respectively provide the XCOLOUT signals (also shown in FIG. 9) on the lines 96a and 96b to the collision detect stage. The carrier collision and detect stage 114 corresponds to the detect stage 98 in FIG. 9.

The collision detect stage 114 in FIG. 11 respectively passes the XCRSIN signals on the lines 88a and 88b, and the XCOLIN signals (also shown in FIG. 9) on the lines 99a and 99b, to the data forwarding stage 104 in the originating devices 30a and 30c. The data multiplexers 106 in the originating devices 30a and 30c in FIG. 11 respectively receive data (rxdata) on lines 116a and 116b. The data forwarding stages 106 in the originating devices 30a and 30c respectively transmit data (txData) on lines 118a and 118b.

Figure 12:
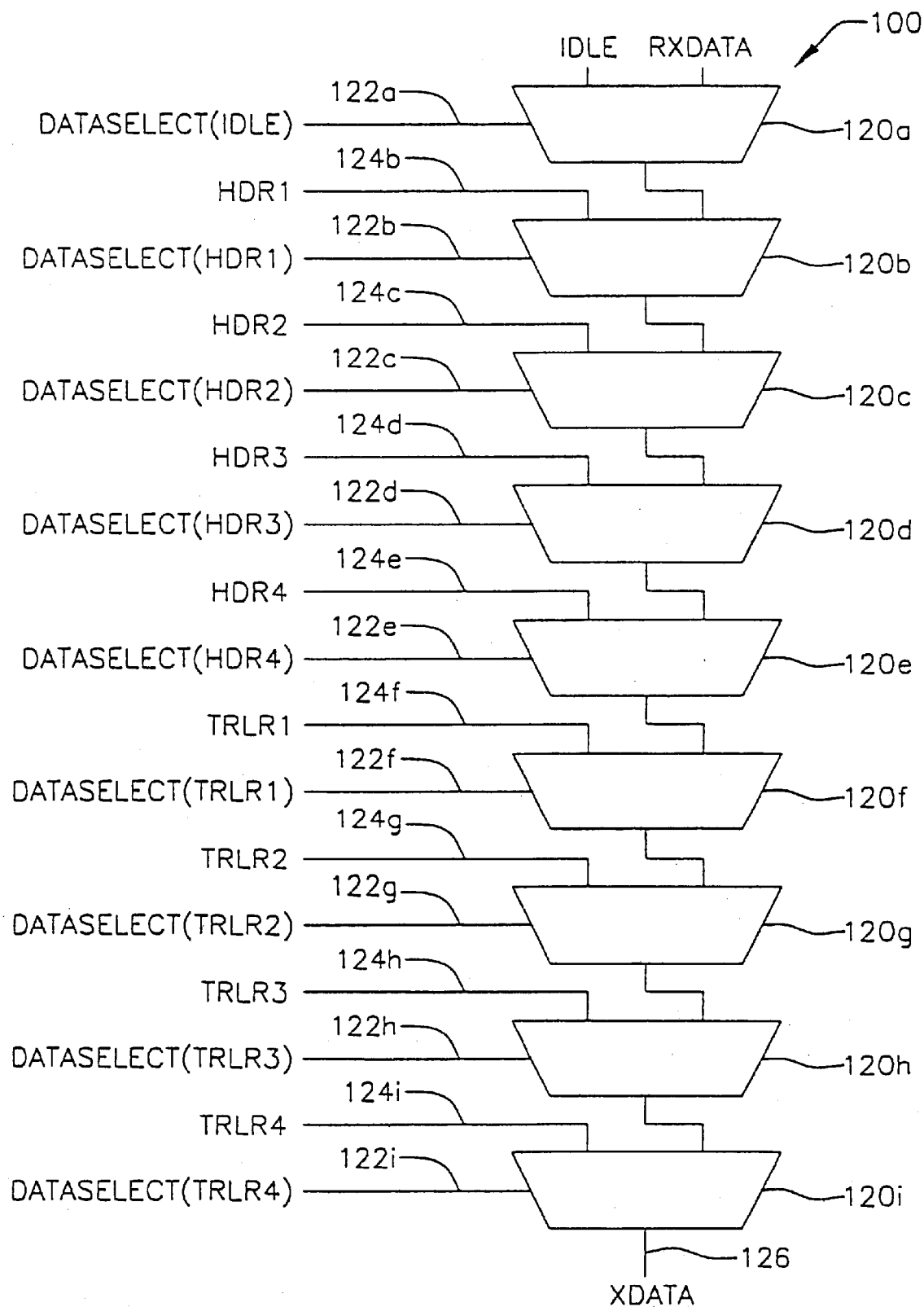
FIG. 12 is a detailed circuit diagram in block form of one of the data multiplexers shown as a single block in the circuit diagram of FIG. 11.

The data multiplexer (MUX) 106 (FIG. 11) is shown in additional detail in FIG. 12. It includes a plurality of multiplexers 120a–120i. The multiplexer 120a has two (2) inputs, one constituting an "idle" and the other constituting received data (rxData). The passage of one or the other of these inputs through the multiplexer 120a is controlled by a signal on a dataselect(idle) line 122a.

Each of the multiplexers 120b–120i respectively has a first input from the output of the previous stage. Each of the multiplexers 120b–120i respectively has a second input from an individual one of lines 124b–124i. The lines 124b–124e are respectively designated as hdr1–hdr4. They provide the header nibbles H1–H4. The lines 124f–124i are respectively designated as trlr1–trlr4. They provide the trailer nibbles T1–T4. The operation of each of the multiplexers 122b–122i is respectively controlled by an individual one of control lines 122b–122i. The control lines 122b–122e are respectively designated as dataselect(hdr1)–dataSelect(hdr4)). The control lines 122f–122i are respectively designated as dataSelect(trlr1)–dataSelect(trlr4).

The operation of the multiplexer 106 in FIG. 12 may be seen from the following examples. When the dataselect (hdr1) signal on the line 122b is a binary 1, the hdr1 signal on the line 124b passes through the multiplexer 120b. The hdr1 signal actually constitutes the H1 nibble in the header. Since the hdr1 signal is a nibble, a data multiplexer corresponding to the multiplexer 120b would be provided for each of the four (4) binary bits in the header nibble H1. When the dataSelect(hdr1) signal is a binary 0, the output signal from the multiplexer 120a passes through the multiplexer 120b. Thus, if all of the data Select signals on the lines 122b–122i constitute binary 0's, the received data (rxData) introduced to the multiplexer 120a passes through all of the multiplexers to a line 126 constituting the output of the multiplexer 120i. The data on the line 126 is designated as xdata. In this way the originating device 30a either passes the received data (rxData) or substitutes header nibbles H1–H4 for the first four (4) nibbles of the preamble and provides the four additional nibbles T1–T4 for the trailer.

Figure 13:
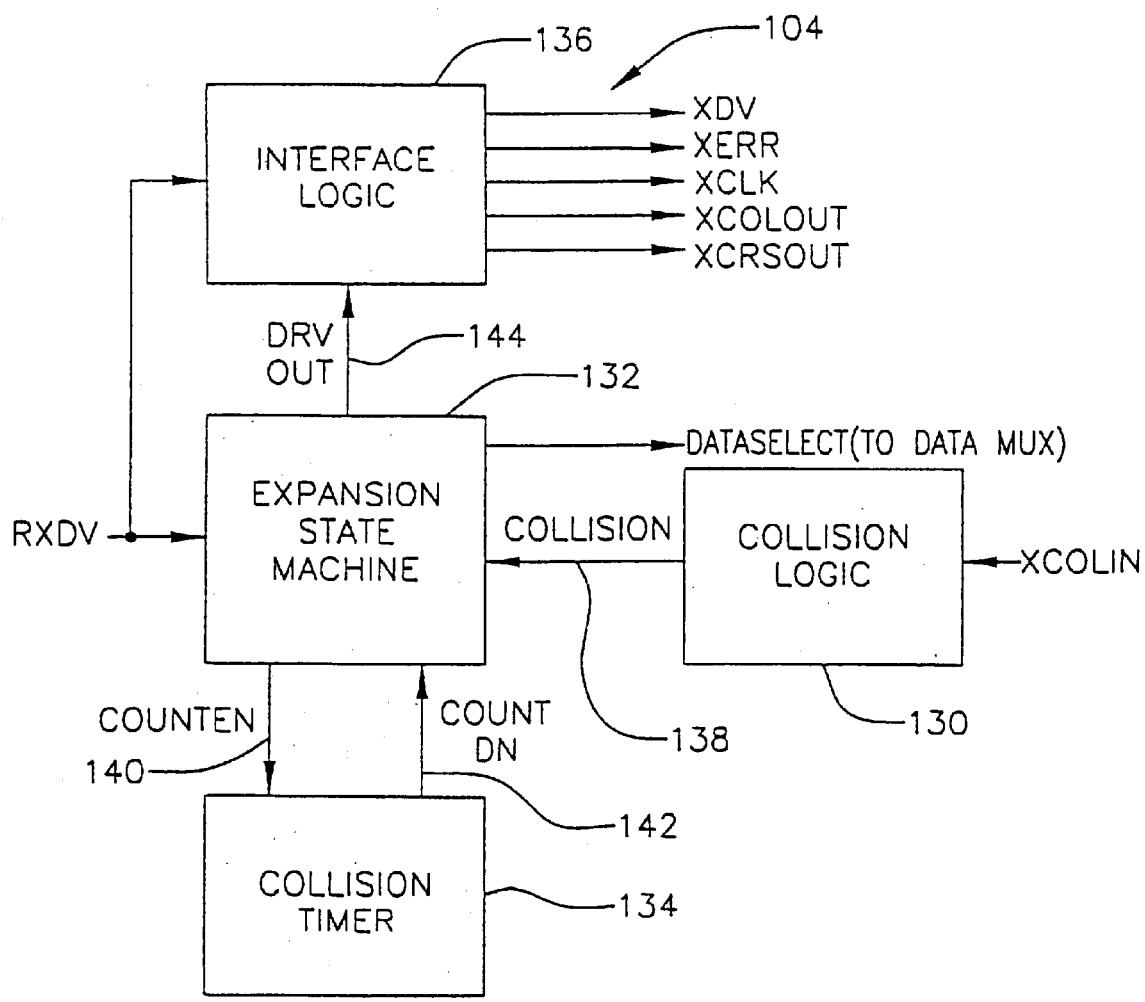
FIG. 13 is a detailed circuit diagram in block form of an expansion controller and arbiter shown as a single block in the circuit diagram of FIG. 11.

The expansion controller and arbitration stage 104 in FIG. 11 is shown in additional detail in FIG. 13. It includes collision logic 130, an expansion state machine 132, a collision timer 134 and interface logic 136. The collision logic 130 receives the XCOLIN signal on the line 99a (see also FIGS. 9 and 11) and introduces a collision signal on a line 138 to the expansion state machine 132. The expansion state machine 132 also has an input from the received data valid (rxdv) line 112a (also shown in FIG. 11) and provides an output on the dataSelect lines 122a–122i to the data multiplexers 120a–120i in FIG. 12.

The expansion state machine 132 also provides a count enable (counten) signal on a line 140 and a count down (countdn) signal on a line 142. The count enable signal on the line 140 initiates the Collision Resolution Time indicated at 95 in FIG. 20. The count down signal on the line 142 decrements the Collision Resolution Time on a periodic basis to indicate at each instant the period that remains in the Collision Resolution Time 95.

The signal on the received data valid (rxdv) line 112a is also introduced to the interface logic 136. The interface logic 136 also receives a drv out signal on a line 144 from the expansion state machine 132. The drv out signal indicates the end of the Collision Resolution Time. The interface logic 136 provides a plurality of outputs: (1) the data valid (xdv) signal 60 in FIGS. 4, 7 and 20, (2) the collision (xerr) indication 70 in FIG. 20, (3) the xclk signal 92 in FIGS. 7 and 20, (4) the XCOLOUT indication on the line 96a (also shown in FIGS. 9 and 11) and (5) the XCRSOUT indication 84a (also shown in FIGS. 9 and 11).

Figure 14:
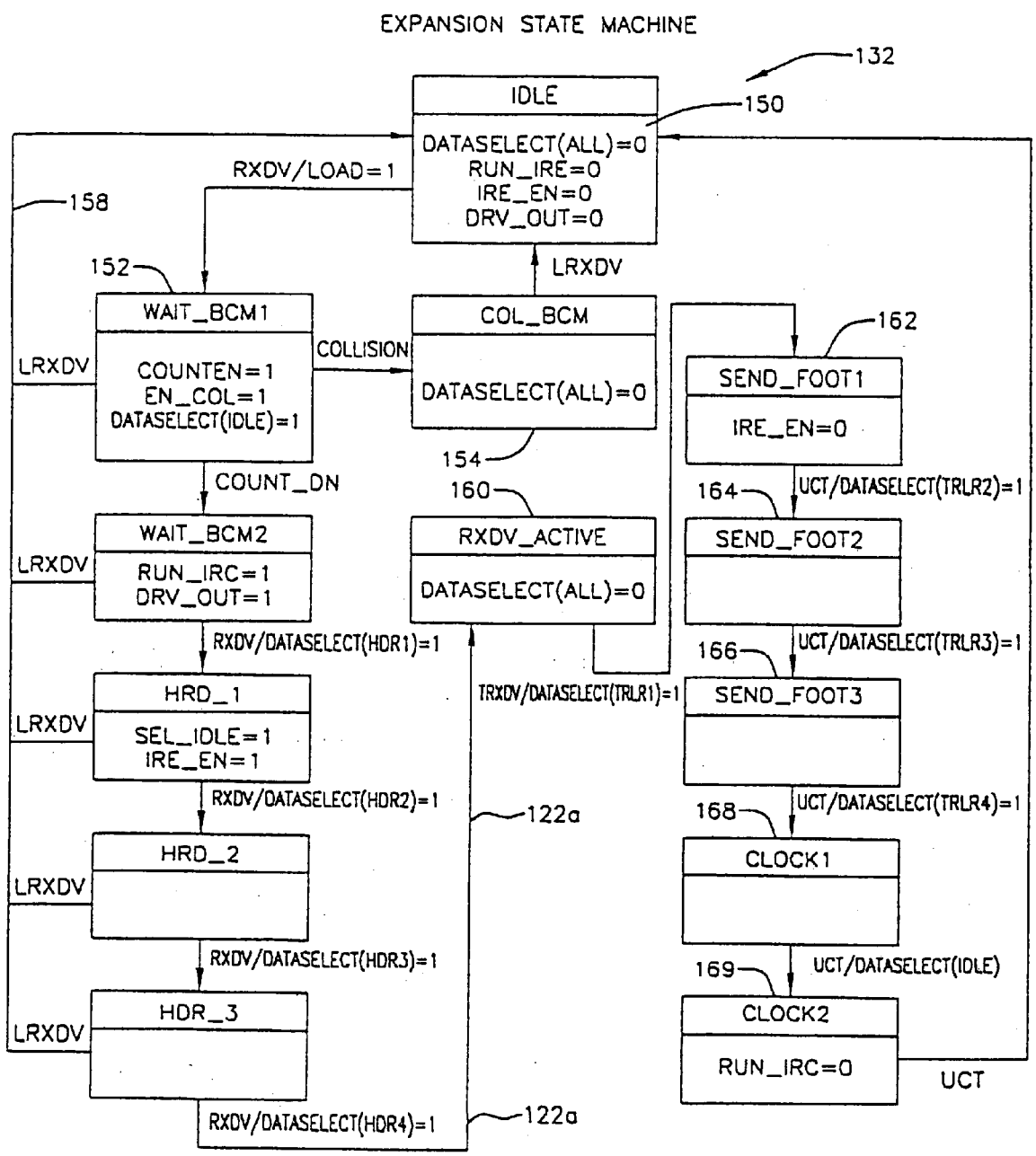
FIG. 14 is a detailed circuit diagram in block form of an expansion state machine shown as a single block in the circuit diagram of FIG. 13.

The Expansion State Machine 132 in FIG. 13 is shown in additional detail in FIG. 14 in the form of a flow chart or diagram. The flow chart includes an idle block 150 which activates a WAIT_BCMI stage 152 to obtain the production of the XCRSOUT signal 90 in FIG. 20 and initiate the production of the Collision Resolution Time indicated at 95 in FIG. 20. The stage 152 then initiates the downward counting on a periodic basis of the Collision Resolution Time 95.

During the period of the countdown, the stage 152 sends a collision signal to a COL_BCM stage 154 if a collision is indicated. The stage 154 then sets all of the dataSelect(all) signals in FIG. 12 to 0 to provide for the operation of the multiplexers 120a–120i in FIG. 12 in the idle state. The expansion state machine 132 then remains in the idle state during all of the time that the packet involved in the collision is providing nibbles and thereafter until a new packet is received.

At the end of the Collision Resolution Time (95 in FIG. 20), the WAIT_BCMI stage provides a signal on a line 156 provided that no collision has occurred in the time period 95 in FIG. 20. This causes the XDIR_0 signal 94 in FIG. 20 to be turned on and the production of the XCLK signals 92 in FIG. 20 to be initiated. In successive ones of the XCLK signals 92, the header nibbles H1, H2, H3 and H4 are generated as a result of the generation of the control signals dataSelect(hdr1), dataSelect(hdr2), dataSelect(hdr3) and dataSelect(hdr4) on the lines 122b, 122c, 122d and 122e (also shown in FIG. 12). However, if the data valid signal 60 (FIGS. 4, 7 and 20) is not produced in any of these clock signals, a signal is generated on a line 158 in FIG. 14 and is introduced to the idle stage 150 to provide for an idle operation during the remaining time of the packet.

An RXDV_ACTIVE state is entered in an RXDV_ACTIVE stage in FIG. 14 as a result of the rxdv input control signal causing the transition from HDR.3 to RXDV_ACTIVE. When no data valid signal (!rxdv) signal 60 is being received and the dataSelect(trler) signal on the control line 122f (also shown in FIG. 12) is a binary 1, a SEND_FOOT1 stage 162 in FIG. 14 produces a T1 nibble. In like manner, a SEND_FOOT2 stage 164, a SEND_FOOT3 stage 166 and a SEND_FOOT4 stage 168 produce the trailer nibbles T2, T3 and T4 in response to control signals uct/dataSelect(trlr2), uct/dataSelect(trlr3), and uct/dataSelect(trlr4) control signals, (the dataSelect(trlr2), dataSelect(trlr3) and dataSelect(trlr4) control signals also being shown in FIG. 12. The "uct" in the control signals specified above indicates that the transfer is unconditional and is not dependent upon any condition. When the trailer nibbles T1–T4 have been produced, the stage 150 is set to the idle state to wait until a new packet is provided. This is provided by a uct signal on a line 169.

Figure 15:
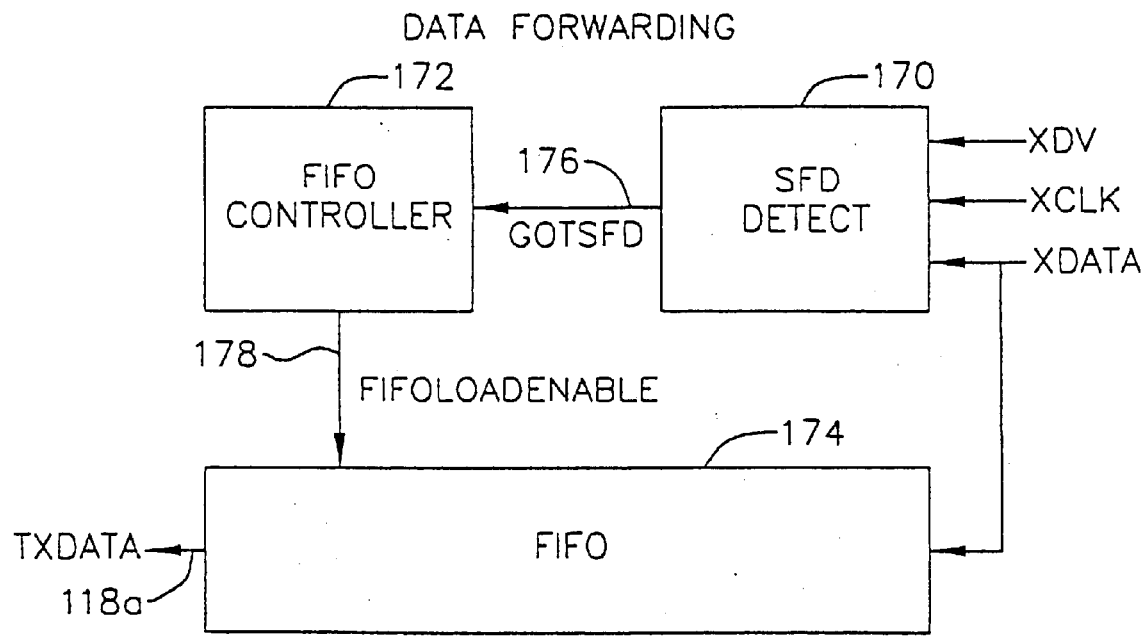
FIG. 15 is a circuit diagram in block form and shows in additional detail a data forwarding stage shown as a single block in FIG. 11.

The data forwarding stage 108 shown in FIG. 11 as a single block is shown in additional detail in FIG. 15. The blocks shown in FIG. 15 include a start-of-frame detector (SFD) 170, a first-in-first-out (FIFO) controller 172 and a FIFO 174. The start-of-frame detector 170 receives the data valid (xdv) signals 60 (see also FIGS. 4, 7 and 20), the xclock (xclk) signals 92 (also shown in FIG. 20) and the xdata signals 104 (also shown in FIG. 20) and produces a GOT SFD signal on a line 176. This signal indicates that the start-of-frame 16 in the packet 40 has been detected. This signal activates the FIFO controller 172 which produces a fifoLoadanable signal on a line 178. The signal on the line 178 enables the data to be loaded into the FIFO 174. The data is subsequently transferred from the FIFO 174 for the originating device 30a on the txdata line 118a also shown in FIG. 11.

Figure 16:
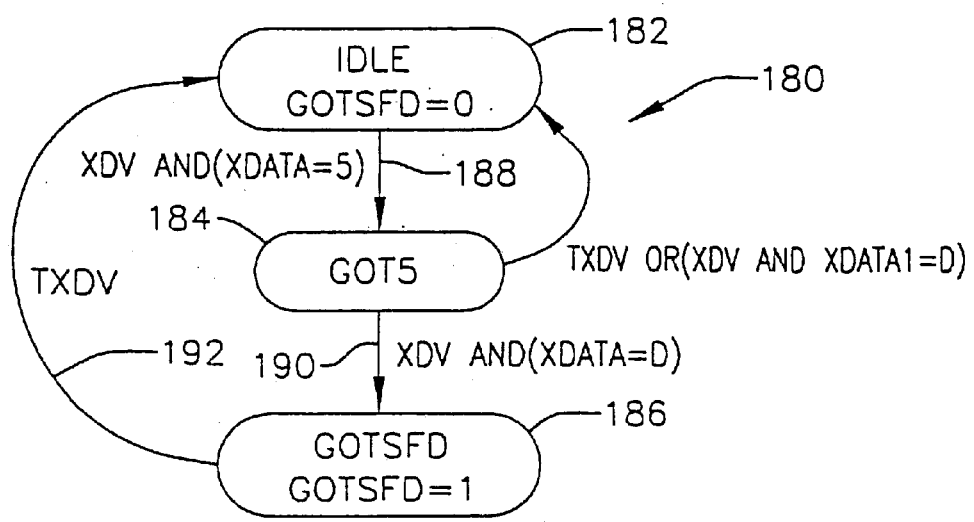
FIG. 16 is a detailed circuit diagram in block form of a start-of-frame detect stage shown as a single block in FIG. 15.

FIG. 16 shows a start-of-frame detect machine generally indicated at 180. The state machine 180 may be considered as a part of the start-of-frame detect stage 170 in FIG. 15. The state machine 180 may be considered to include an idle state 182, a GOT5 state 184 and a GOTSFD state 186. A line 188 extending from the idle state 182 to the GOT5 state 184 activates the GOT5 state when the line provides the data valid signal 60 (FIGS. 4, 7 and 20) and the xdata provides a hexadecimal value of five (5) represented by a binary pattern of 0101.

A line 190 extending from the GOT5 state 184 to the GOTSFD state 186 activates the GOTSFD state 184 when the line provides the data valid signal 60 (FIGS. 4, 7 and 20) and the xdata provides a hexadecimal value of D (represented by a binary pattern of 1101). When this occurs, the originating device 30a processes the remainder of the packet and sends an !xdv signal on a line 192 at the end of the packet to return the SFD State Machine to the idle state 182. As previously described, the !xdv state occurs when the data valid signal 60 (FIGS. 4, 7 and 20) is no longer produced.

Figure 17:
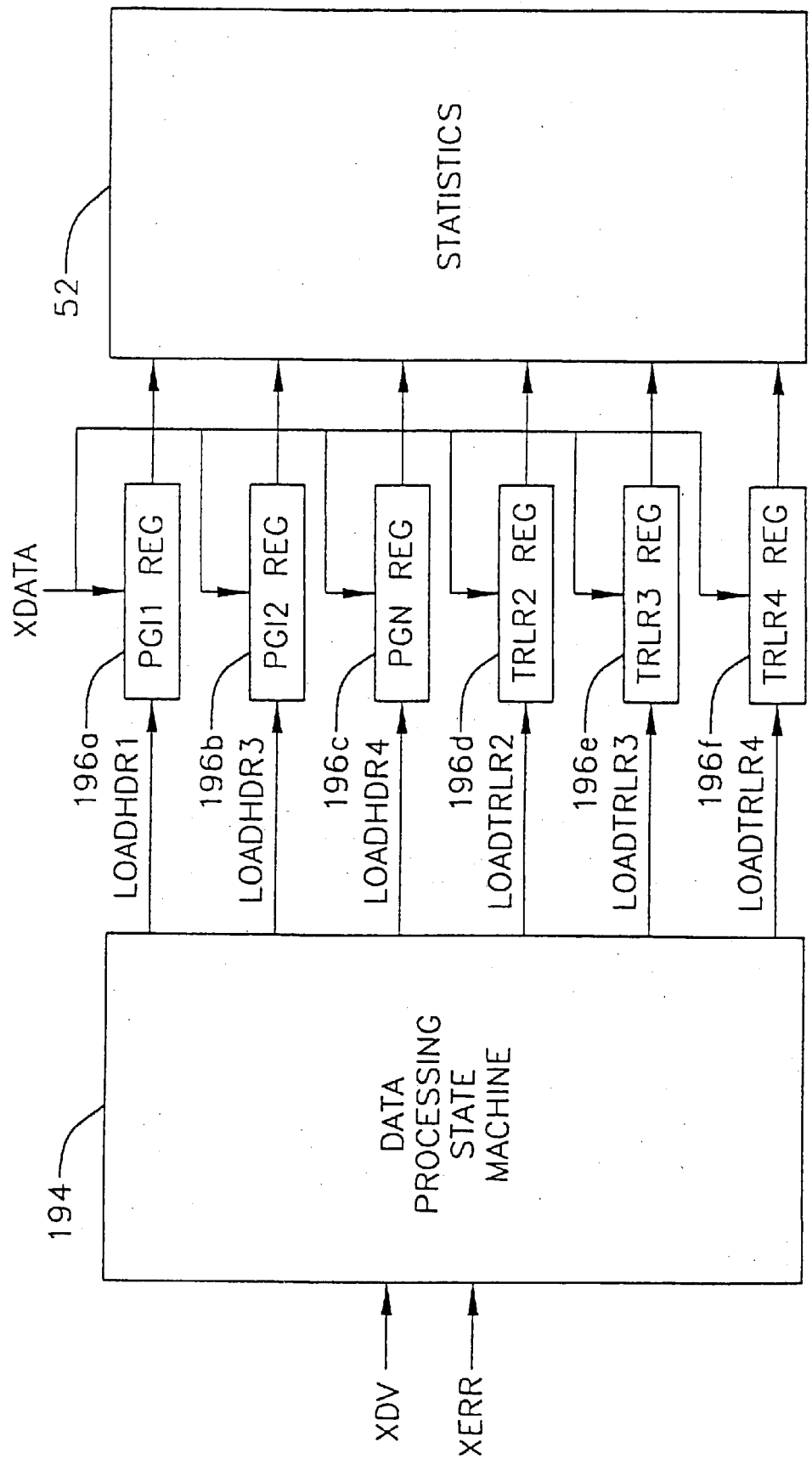
FIG. 17 is a detailed circuit diagram in block form of a data processor shown as a single block in FIG. 11.

The data processor 110 in FIG. 11 is shown in additional detail in FIG. 17. The data processor 110 includes a data processing state machine 194 and the statistics block 52. It also includes a plurality of registers 196a–196f. The data valid (xdv) signal 60 (FIGS. 4, 7 and 20) and the collision (xerr) signal 70 (FIGS. 7 and 20) are introduced to the data processing state machine 194. The registers 196a–196c are respectively designated as PGI1–PGI3 and the registers 196d–196f are respectively designated as TRLR2–TRLR4. LoadHDR1, loadHDR2 and loadHDR3 signals are respectively introduced to the registers 196a–196c from the data processing state machine 194 and loadTRLR2, loadTRLR3 and loadTRLR4 signals are respectively applied to the registers 196d–196f. The signals from the registers 196a–196f are introduced to the statics stage 52 for recording in this stage.

Header signals for the H2 nibble are not introduced from the data processing state machine 194 to a register corresponding to the registers 196–196c because all of the binary bits for the header nibble H2 are 0. (See FIG. 3.) Similarly, trailer signals for the T1 nibble are not introduced from the data processing state machine 194 to a register corresponding to the registers 196d–196f because all of the binary bits for the trailer nibble T1 are 0. (See FIG. 5.)

Figure 18:
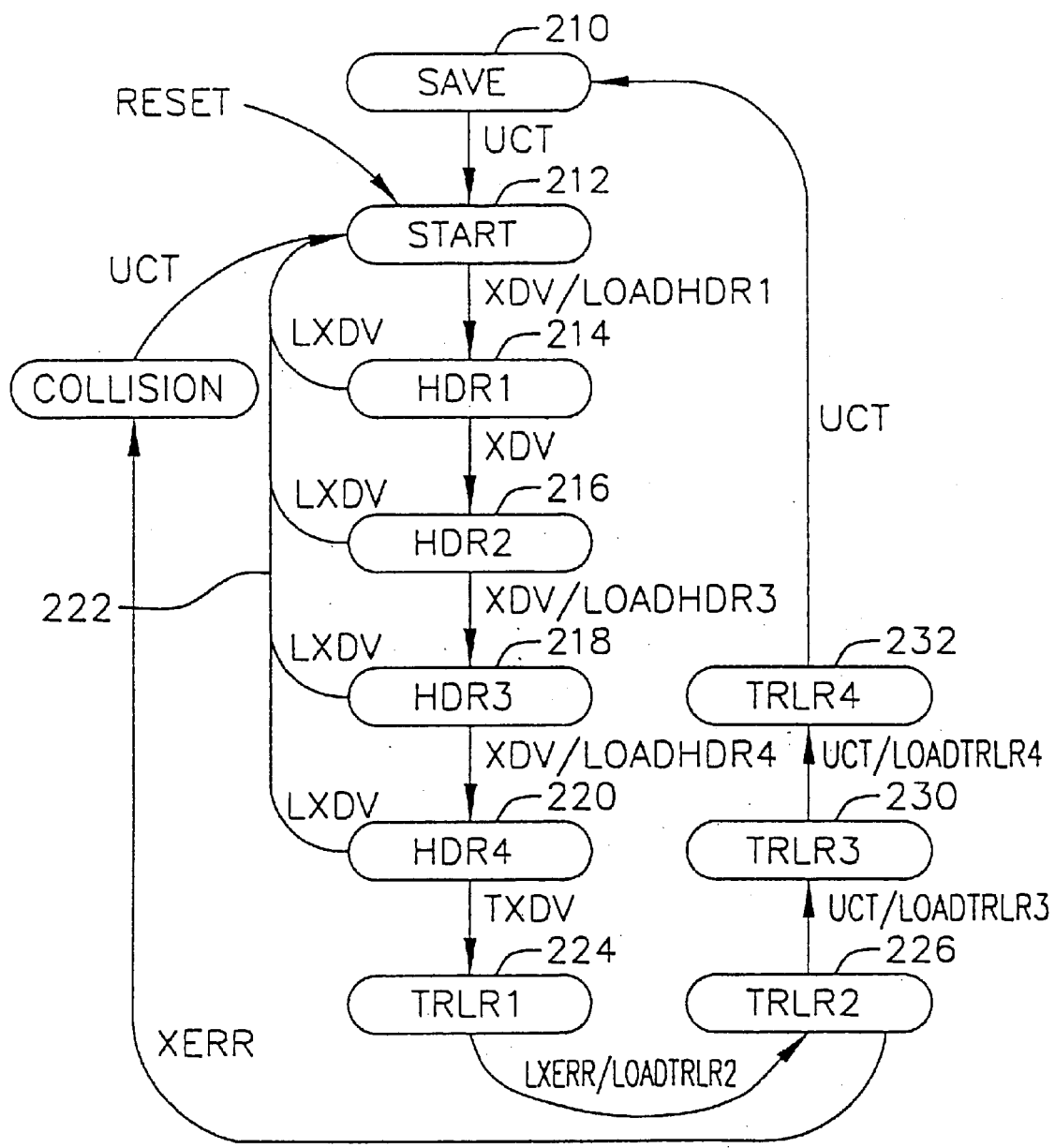
FIG. 18 is a detailed circuit diagram in block form of a data processing state machine shown as a single block in FIG. 17.

FIG. 18 is a flow chart or diagram showing the operation of the data processing state machine 194 in FIG. 17. As a first operation, an unconditional (uct) transfer is provided from a Save state 210 to a Start state 212. When there is a data valid (xdv) signal 60 (FIGS. 4, 7 and 20), the header nibble H1 is loaded into the packet 40 as shown at 214. An advance is then made to header nibble 2, as indicated at 216, when there is a data valid (xdv) signal.

Nothing is loaded in header nibble 2 because there are all binary 0's in header nibble H2 (see FIG. 3). When there is a data valid (xdv) signal 60, an advance is then made to load header nibble H3 as indicated at 218 in FIG. 18. Thereafter an advance is made, as indicated at 220, to load header nibble H4 when there is a data valid signal (xdv) 60. If there is no data valid signal to load any of the data nibbles H1, H2, H3 and H4, a return is made to the start state 212 as indicated at 222 in FIG. 18. A "no data" valid signal is indicated at !xdv in FIG. 18.

When there is no collision signal 70 (see FIG. 7), the trailer T1 is loaded as indicated at 224. A "no collision" signal is indicated at !xerr in FIG. 18. When there is no collision signal 70 (see FIG. 4), the Trailer T2 is loaded as indicated at 226. If there is a collision signal, a binary "1" is produced in the trailer T2 (see the XERR column in FIG. 8), and a return is made to the start state 210 as indicated at 228 in FIG. 18. If there is not a binary "1" in the XERR column for the trailer T2 in FIG. 8 to indicate a collision, the trailer T3 is unconditionally loaded, as indicated at 230, in accordance with the load TRLR3 signal. Similarly, the trailer T4 is unconditionally loaded, as indicated at 232, in accordance with the load TRLR signal. When this loading has been completed, a return is made to the Save state 210 as indicated at 232 in FIG. 18.

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

What is claimed is:

1. In combination for use with a plurality of originating devices and a plurality of ports on each of the originating devices in sending packets of binary coded signals, each packet including binary coded signals representing a preamble, a start-of-frame delimiter, and data, the packets being formed from successive nibbles, each nibble defined by a plurality of binary bits, a packet receiver receiving such packets, at an individual one of the originating devices, and at an individual one of the plurality of ports in such originating device; and a packet modifier, at the individual one of the originating devices, adapted to modify a first portion of the preamble to provide a header indicating the individual one of the originating devices and the individual one of the ports in such individual one of the originating devices, the packet modifier being operative to provide a last nibble in the header and a first nibble in a second portion of the preamble, in a pattern distinguishing the header and the second portion of the preamble, or any two (2) nibbles of the header from the start-of-frame delimiter.

2. In combination for use with a plurality of originating devices and a plurality of ports on each of the originating devices in sending packets of binary coded signals, each packet including binary coded signals representing a preamble, a start-of-frame delimiter, and data, a packet receiver receiving such packets, at an individual one of the originating devices, and at an individual one of the plurality of ports in such originating device;

a packet modifier, at the individual one of the originating devices, adapted to modify a first portion of the preamble of a packet to provide a header indicating the individual one of the originating devices and the individual one of the ports in such individual one of the originating devices;

an observing station for receiving the packet with the header, the second portion of the preamble, the start-of-frame delimiter, and the data;

a header processor at the observing station for processing the header to determine the individual one of the originating devices and the individual one of the ports in such individual one of the originating devices; and an observation recorder, at the observing station, adapted to make a record of the individual one of the originating devices and of the individual one of the ports in the individual one of the originating devices.

3. In combination for use with a plurality of originating devices and a plurality of ports on each of the originating devices in sending packets of binary coded signals, each packet including binary coded signals representing a preamble, a starter frame delimiter and data, a packet receiver receiving such packets at an individual one of the originating devices, and at an individual one of the ports in such originating device;

a packet modifier, at the individual one of the originating devices, modifying a first portion of the preamble to provide a header indicating the individual one of the originating devices and the individual one of the ports in such individual one of the originating devices;

an observing station, displaced from the originating devices, receiving the packets from the individual one of the ports in the individual one of the originating devices; and a header processor, at the observing station, processing the headers in the packets to determine the individual one of the originating devices and the individual one of the ports in such individual one of the originating devices.

4. In a combination as set forth in claim 3, an observation recorder, at the observing station, for providing a record of the individual one of the originating devices and the individual one of the ports in such individual one of the originating devices.

5. In a combination as set forth in claim 3, the preamble being in a particular pattern;

the data including information identifying a particular one of the originating devices for receiving the packets; and a preamble modifier, substituting the preamble in the particular pattern for the header at the particular one of the originating devices.

6. A method of indicating an individual one of a plurality of originating devices, and an individual one of ports in such individual one of the originating devices, for receiving packets of binary coded signals from an external source, each of the packets being formed from a plurality of nibbles and including a preamble, a start-of-frame delimiter and data, comprising:

receiving the packets from the external source at the individual one of the ports in the individual one of the originating devices;

substituting a header, indicating the individual one of ports in the individual one of the originating devices, for a first portion of the preamble as represented by a particular number of the nibbles in the preamble;

transmitting the packet with the header, a second portion of the preamble, the start-of-frame delimiter, and the data, to the other originating devices in the plurality of originating devices;

transmitting the packet with the header, the second portion of the preamble, the start-of-frame delimiter, and the data, to an observing station;

determining from the header the individual one of the originating devices in the plurality and the individual one of the ports in the individual one of the originating devices, the determining being at the observing station; and recording, at the observing station, the individual one of the originating devices and the individual one of the ports in the individual one of the originating devices.

7. A method of indicating an individual one of a plurality of originating devices, and an individual one of ports in such individual one of the originating devices, for receiving packets of binary coded signals from an external source, each of the packets being formed from a plurality of nibbles and including a preamble, a start-of-frame delimiter and data, comprising:

receiving the packets from the external source at the individual one of the ports in the individual one of the originating devices, substituting a header, indicating the individual one of ports in the individual one of the originating devices, for a first portion of the preamble as represented by a particular number of the nibbles in the preamble;

transmitting the packet with the header, a second portion of the preamble, the start-of-frame delimiter, and the data, to the other originating devices in the plurality of originating devices, wherein one of the originating devices in the plurality other than the individual one of the originating devices substitutes the preamble for the header in the transmitted packets and transmits the packets with the preamble, the start-of-frame delimiter and the data;

transmitting the packet with the header, the second portion of the preamble, the start-of-frame delimiter and the data to an observing station;

determining from the header the individual one of the originating devices in the plurality and the individual one of the ports in the individual one of the originating devices, the determining being at the observing station; and recording, at the observing station, the individual one of the originating devices and the individual one of the ports in the individual one of the originating devices.

* * * * *